United States Patent [19]
Schultz

[11] 3,866,895
[45] Feb. 18, 1975

[54] SUSPENSION SYSTEM FOR VEHICLES

[75] Inventor: Forrest O. E. Schultz, Owosso, Mich.

[73] Assignee: Midland-Ross Corporation, Cleveland, Ohio

[22] Filed: Oct. 1, 1973

[21] Appl. No.: 402,263

[52] U.S. Cl. ............................................. 267/65 D
[51] Int. Cl. ........................................... B60q 11/30
[58] Field of Search ................................ 267/65 D

[56] References Cited
UNITED STATES PATENTS 3,059,918  10/1962  Pribonic............................ 267/65 D
3,730,473  5/1973  Pepi................................. 267/65 D Primary Examiner—James B. Marbert
Attorney, Agent, or Firm—Irvin L. Groh

[57] ABSTRACT

An automatically operated vehicle air suspension system including a pump, a reservoir and suspension units between sprung and unsprung portions of the vehicle all interconnected in a closed air system containing a charge of air and employing a control mechanism responsive to changes in the vertical spacing between sprung and unsprung portions to increase or decrease air pressure in the suspension units by pumping air from the reservoir to the suspension units or from the latter to the reservoir.

11 Claims, 2 Drawing Figures

PATENTED FEB 18 1975　　　　　　　　　　　　　　　　3,866,895

SUSPENSION SYSTEM FOR VEHICLES

BACKGROUND OF THE INVENTION

This invention relates to an air suspension system for vehicles and more particularly to a suspension system employing a closed air system.

Various forms of air suspension systems for vehicles have been proposed in which variable volume suspension units are disposed between the sprung and unsprung portions of the vehicle and in which a height sensing mechanism senses changes between the sprung and unsprung portions of the vehicle to actuate mechanism to either increase or decrease the pressure in the suspension units to maintain a predetermined vertical spacing. In such systems it is usual to use an air pump to deliver air to a reservoir or to the suspension units as demand requires. Unfortunately, demand can occur under environmental conditions which introduces moisture or dirt into the system adversely affecting its operation. In addition, when pressure is to be decreased, it is normal practice to exhaust the air from the suspension units directly to the atmosphere. Eventually, the air that has been exhausted must be replenished which requires a relatively large pump and reservoir.

SUMMARY OF THE INVENTION

It is an object of the invention to provide an air suspension system in which the suspension units, a reservoir and pump are connected together in a closed system.

It is a further object to provide such a closed air suspension system in which the pump compresses air in either the suspension units or the reservoir using the reservoir and the suspension units, respectively, as the source of supply.

Still another object of the invention is to provide an air suspension system in which the pressure differential between the reservoir and suspension units are equalized under certain conditions of operation before any pumping action is required thereby increasing the speed of response of the system and decreasing the power required to operate the pump.

An air suspension system for vehicles if provided in which an air pump, reservoir and the suspension units between sprung and unsprung portions of the vehicle are interconnected in a closed system containing a charge of air, and in which a control mechanism is actuated in response to changes in a predetermined vertical spacing between sprung and unsprung portions to cause the pumps to compress air and deliver it to either the suspension units or to the reservoir using the reservoir or the suspension units as the respective supply of air. The control mechanism operates to initially equalize the pressures when the pressure in the suspension units requires an increase and the pressure in the reservoir is higher than in the suspension units and also when the pressure in the suspension units requires a decrease and the pressure therein is higher than that in the reservoir. Thereafter, the pump is utilized to provide any differential between the equalized pressure and the required amount. Such operation makes for rapid response of the system and reduces the power requirements for operating the pump.

DETAILED DESCRIPTION

Figure 2:
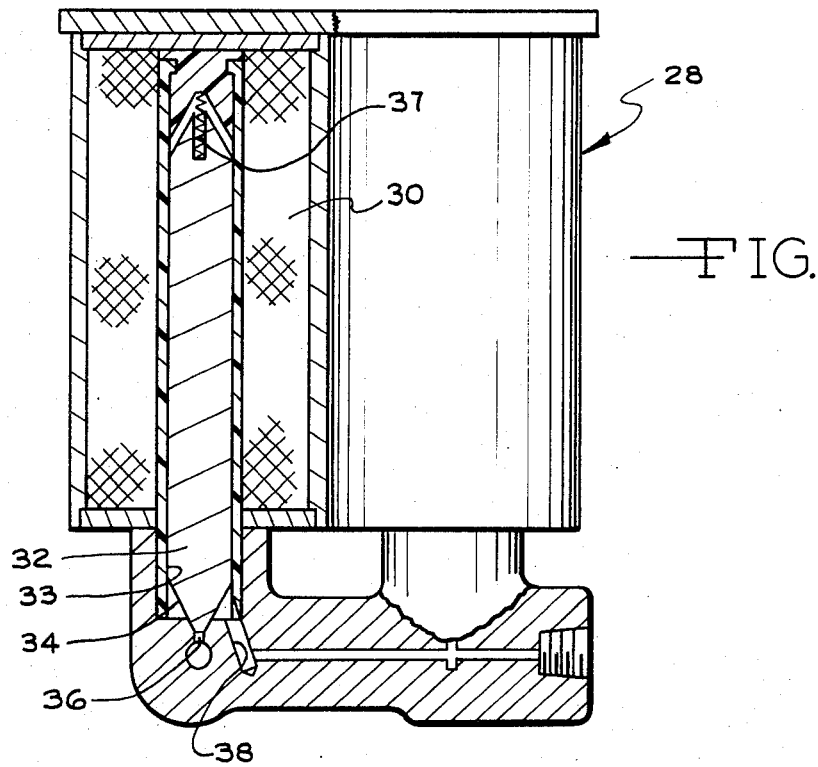
FIG. 2 is a cross-sectional view of one of the valve elements shown in FIG. 1.

Referring to the drawings, the air suspension system embodying the invention includes an air pump or compressor 10 which is electrically driven by a directly coupled electric motor 12. The pump 10 is arranged to deliver air to a reservoir 14 or to air supports or suspension units 16. The pump 10, reservoir 14 and air suspension units 16 are interconnected in a closed system which is precharged with air at a pressure approximately midway of the desired pressure operating range of the system.

Figure 1:
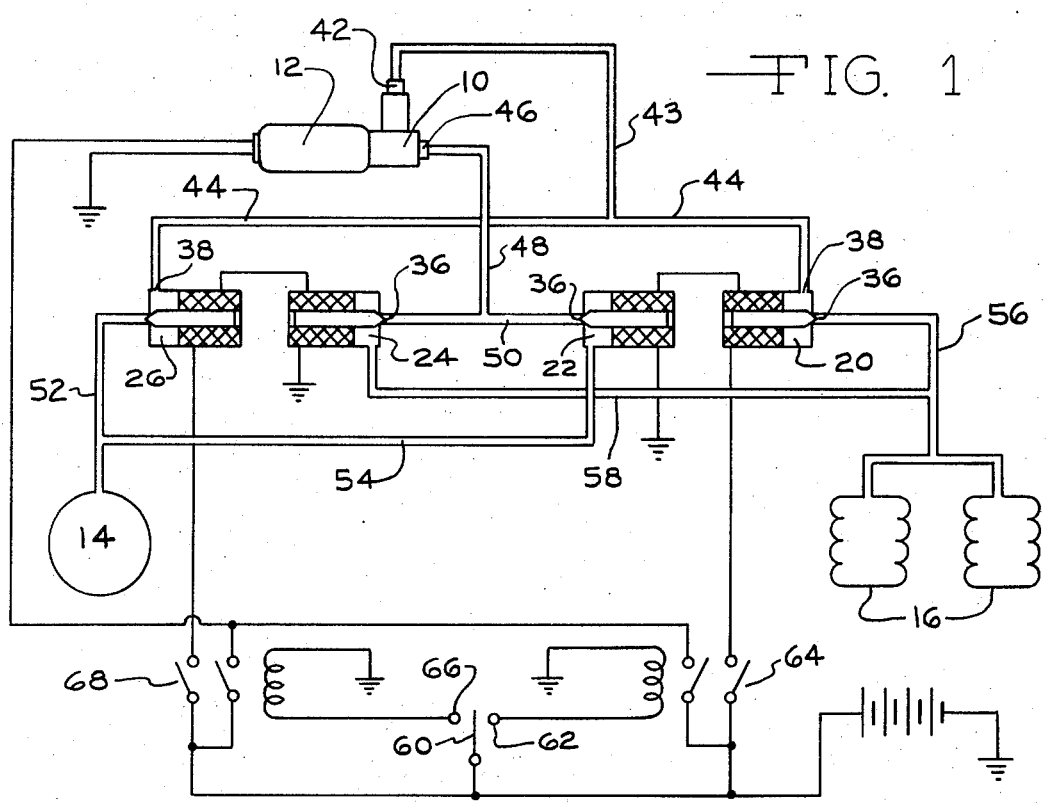
FIG. 1 is a schematic view of a vehicle air suspension system embodying the invention.

The delivery of air to either the reservoir 14 or to the air suspension units 16 is under the control of a valve assembly 28 indicated generally in FIG. 2 which incorporates four identical valves 20, 22, 24, 26 all of which are illustrated schemmatically in FIG. 1.

The valve 20 which is shown in FIG. 2 includes a solenoid 30. The solenoid is energized and deenergized in a manner to be later described to reciprocate a plunger 32 in a bore 33. The end of the plunger 32 is provided with a conical end 34 which acts as a valve closure element normally closing an inlet port 36. A light spring 37 acts on the plunger 32 to insure that the valve 34 closes on the seat at the inlet port 36 when the solenoid is deenergized. The bore 33 also communicates by way of an outlet port 38 with various air communicating lines which will be described later.

The valves 20, 22, 24 and 26 are of a type which permit movement of the plunger 32 and opening of the valve closure element 34 from the inlet port 36 when the pressure is higher at the inlet port 36 than at the outlet port 38. On the other hand, a higher pressure at the outlet port 38 than at the inlet port 36 permits the valve element 34 to remain in a closed position. Consequently, the valves act as a one way check valve permitting air communication from the inlet port 36 to the outlet port 38 but prevent communication in the opposite direction except when the valves are moved to their open position by energization of the solenoid 30.

The valves 20, 22, 24 and 26 are connected together as indicated in FIG. 1. The air pump or compressor 10 has the usual one way discharge valve 42 which is connected by line 43 and lines 44 to the outlet ports 38 of the valves 20 and 26. The intake of the pump 12 indicated generally at 46 is connected by lines 48 and 50 to the inlet ports 36 of the valves 22 and 24.

The reservoir 14 which stores air pressure for operation of the system is connected by way of line 52 to the inlet of valve 26 and by way of line 54 to the outlet of valve 22.

The air supports 16 are connected by a line 56 to the inlet 36 of the valve 20 and by way of a line 58 to the outlet of valve 24.

The solenoids 30 of the valves 20 through 26 are energized in response to an electrical circuit which includes a height sensing switch 60 which is the equivalent of a single pole double throw, center off electrical switch. When air pressure in the support 16 is insufficient to support the vehicle chassis at the desire height, the switch closes to the terminal 62 to energize a relay 64 which is the equivalent of a double pole, single throw, normally open relay. When the air pressure in the air sping supports is higher than necessary and the vehicle chassis is above the desired level, the height sensing switch 60 closes to the terminal 66 and energizes the relay 68 which is identical to the relay 64.

The solenoids 30 of the valve 20 and 22 are wired in series in a manner that causes the valves 20 and 22 to open and close in unison and act as a first valve means as the circuit is energized and deenerzied. In a similar manner, the solenoid 30 of the valves 24 and 26 are wired in series for simultanious operation and act as a second valve means. From the electrical circuitry it will be seen that only one pair of solenoids associated with the valves 20 and 22 forming the first valve means or with the valves 24 and 26 forming the second valve means can be energized at a given time but all four of the solenoids 30 associated with the valves 22 through 26 can be deenergized at any given time. Thus there are three possible modes of operation of the air suspension system.

Referring to the drawing, the air suspension system shown in FIG. 1 is illustrated in its holding mode of operation. Under such conditions all of the solenoids are deenergized and there are three possible air pressure differential relationships that can exist between the air reservoir 14 and the air supports or springs 16. First, the air pressure in the supports and the air reservoir can be equal in which case there would be no tendency for air pressure change or fluid flow in either direction. In a second situation, the air supports 16 can be at a higher pressure than the pressure in the reservoir 14. In this case fluid flow from the air supports toward the reservoir is interrupted by the closed valve 24. Valve 20 will open due to the high air pressure in line 56 and communicate air to its outlet port 38 but the passage of air to the reservoir 14 will be obstructed by the closed valve 26 and by the closed one way discharge valve 42 at the air pump 10. In a third condition of pressure differential, the air pressure in the air supports 16 can be lower than the air pressure at the reservoir 14. In this situation the tendency for fluid pressure transfer to the air support 16 iss interrupted by the closed valve 22 which will not respond to the air pressure in the line 54. Although the valve 26 will open due to higher pressure in the line 52, the passage of air to the support 16 is obstructed by the valve 20 which will be closed.

With the system in the holding mode described above, all three of the air pressure relationships described can occur rapidly and in random succession due to pressure fluctuations fluctutations in the supports 16 induced by the normal bound and rebound of a vehicle in motion on a road surface.

In the event that the height sensing switch 60 indicates the necessity of increasing the pressure in the support 16 to raise the vehicle chassis relative to its wheel or road running gear, the switch 60 will close to the terminal 62 which will complete the electrical circuit to the solenoids 30 the valves 20 and 22 so that they open and also to the electrical motor 12 associated with the pump 10. The action of the pump is dependent upon which of two different possible pressure relationships exist between the air support 16 and the reservoir 14. For example, if the reservoir 14 is at a lower pressure than the pressure of the air supports 16, a portion of the air remaining in the reservoir 14 is made available through the line 54, the open valve 22, the line 50 and 48 to the intake 46 of the air pump 10. This air is compressed by the pump 10 and discharged through the discharge valve 42, line 43 and 44, through the open valve 20 to the line 56 and the air support 16. Under this condition it will be noted that both the valves 20 and 22 are held open by their respective solenoids 30.

Under the same condition of operation, that is, with the height sensing switch 60 closed to the terminal 62 to increase the pressure in the supports 16 to raise the chassis but with the reservoir already at a higher pressure than that of the supports 16 there will be a direct flow of air from the reservoir to the supports 16 due to the higher pressure in the former. The direct communication of air from the reservoir 14 to the supports 16 occurs through the line 52, the valve 26, which will open against the higher pressure in the reservoir 14, the line 44 and the open valve 20 to the line 56.

The direct flow resulting from pressure differential in the reservoir 14 and the air supports 16 greatly decreases the time required to make the necessary height adjustment. The necessary air change is initiated without the requirement of pumping until the pressures in the reservoir 14 and the supports 16 is equalized. Thereafter, the pump 10 supplies any additional air pressure which may be required at the supports 16 through the lines 43 and 44 and the open valve 20 to the line 56. The initial equalization of pressures not only decreases the response time but also acts to relieve the pump of its burden of pumping air and conserves the consumption of electrical current.

If, for example, the reservoir 14 is at a pressure of 60 psi. and the spring supports at a pressure of 50 psi., a correction to increase the height of the vehicle would result in an initial equalization of pressures to 55 psi. in both the reservoir 14 and the supports 16. If the height change requires a pressure of 60 psi. in the supports 16, the pump 10 must supply only the differential of 5 psi. By contrast, without initial equalization, the pump would be requires to supply the differential between 50 psi. and 60 psi. which not only would require additional time but also would consume additional electric current.

In the event that the height sensing switch 60 signals a requirement for the vehicle height to be lowered by reducing the pressure in the support 16, the switch 60 is close to the terminal 66 to energize the relay 68 and the solenoids 30 to open the valves 24 and 26 as well as to energize motor 12 driving the pump 10. This is the pumping down or lowering mode of operation of the air suspension system. Again, the operation of the system is dependent on which of the two pressure differential relationships exist between the reservoir and the suspension units. If for example the reservoir is at a higher pressure than the supports, a portion of the air remaining in the supports 16 is received by the pump 10 through the line 58, the open valve 24 and the line 48 and is discharged through the line 43 and 44 through the open valve 26 and the line 52 to the reservoir 14. If the supports 16 are at a higher pressure than that of the reservoir 14, the opening of valve 26 by it associated solenoid 30 will permit direct air flow from the supports 16 through the line 56 and the valve 20 which will open against the differential pressure to permit the passage of air to the line 44 and through the open valve 26 to the reservoir 14. Again, the advantage of direct flow from the supports to the reservoir before the pump 10 becomes fully operative has already been pointed out in that the speed of response of the system is not dependent solely on the pump so that there is a savings of both time and energy.

It will be seen that an air suspension system for vehicles has been provided in which the various air components are arranged in a closed system precharged with air and controlled so that the pump delivers air from either the reservoir or the air suspension units to the suspension units and reservoir, respectively depending on whether the vertical spacing of the sprung and unsprung portions of the vehicle is to be increased or decreased. In the event pressure in the suspension units is to be increased and the pressure in the reservoir is higher than in the suspension units or in the event pressure in the suspension units is to be decreased and the pressure in the reservoir is lower than in the suspension units, the control means permits equalization of the pressures imdependently of the pump and thereafter, if additional pressure change is required, the pump supplies the required pressure to either the suspension unit or the reservoir thereby minimizing energy and time to make the required change.

What is claimed is:

1. A vehicle suspension system comprising a fluid reservoir, a fluid pump, a variable volume fluid suspension unit between sprung and unsprung portions of a vehicle, conduit means interconnecting said suspension unit, reservoir and pump, control means interposed in said conduit means and being operable in response to a first signal to increase pressure and to a second signal to decrease pressure in said suspension unit, means for operating said pump in response to said first and second signals, said control means being initially responsive to said first signal to communicate said reservoir with said suspension unit to equalize pressures in said suspension unit and said reservoir when the pressure in the latter is higher than in said suspension unit and said pump being operable thereafter to receive air from said reservoir and deliver air to said suspension unit until said first signal is terminated, said control means being initially responsive to said second signal to communicate said suspension unit with said reservoir independently of said pump to equalize pressures in said suspension unit and reservoir when the pressure in said suspension unit is higher than the pressure in said reservoir and said pump being operable thereafter to receive air from said suspension unit and deliver it to said reservoir until said second signal is terminated.

2. The combination of claim 1 in which said control means includes a plurality of valves, each of said valves having an inlet and an outlet, said valve normally being closed and being responsive to a pressure at said inlet greater than at said outlet to open selected ones of said valves and being movable to an open position in response to one of said signals independantly of the pressure at said inlets and outlets.

3. The combination of claim 1 in which said control means include first, second, third, and fourth valve means, said valve means including an inlet and an outlet, said valve means normally being closed and being movable to an open position in response to a pressure at said inlet greater than at said outlet, said pump having an air intake means and an air discharge means connected to outlets of said first and fourth valve means, and suspension unit being in communication with the inlet of said first valve means and with the outlet of said third valve means and said reservoir being in communication with the inlet of said fourth valve means and with the outlet of said second valve means.

4. The combination of claim 3 in which said first and second valve means are responsive to said first signal to move to an open position and in which said third and fourth valve means are responsive to said second signal to move to an open position.

5. The combination of claim 4 in which said valve means include solenoid means for moving said valve means from a closed to an open position.

6. The combination of claim 1 and further comprising electrical means for driving said pump in response to said signals.

7. An air suspension system for a vehicle including a pump having an intake port for receiving air and a discharge port for delivering air, a reservoir, and a variable volume suspension unit adapted to be disposed between sprung and unsprung portions of a vehicle, in combination; first valve means controlling communication between said discharge port and said suspension unit and between said intake port and said reservoir and normally being closed, second valve emans controlling communication between said discharge port and said reservoir and between said intake port and said suspension unit normally being closed, actuating means responsive to a first signal of a change of spacing between said sprung and unsprung portions to open said first valve means to increase pressure in said suspension means and responsive to a second signal to open said second valve means to decrease pressure in said suspension means, said first valve means being responsive to a pressure in said suspension unit greater than in said reservoir to open said first valve means when said second valve means are open to communicate said suspension unit to said reservoir independently of said intake and discharge ports to equalize pressures in said reservoir and suspension units, and said second valve means being responsive to a pressure in said suspension units less than in said reservoir to open said second valve means when said first valve means are open to equalize pressures in said reservoir and said suspension means.

8. The combination of claim 7 including driving means for operating said pump, said driving means being operable in response to said first and second signals.

9. The combination of claim 7 in which said first valve means includes a pair of valves, one of said valves controlling communication between said discharge port and said suspension unit, the other of said valves controlling communication between said intake port and said reservoir and which said second valve means includes a pair of valves, one said valve controlling communication between said discharge port and said reservoir and the other of said valves controlling communication between said intake port and said suspension unit.

10. The combination of claim 9 in which said pairs of valves of said first and second valve means each have an inlet and an outlet and in which said valves are responsive to a pressure greater at said inlet than at said outlet to move to an open position.

11. The combination of claim 10 in which said one of said pair of valves of said first and second valve means have their said outlets in constant communication with each other and their said inlets connected to said air suspension unit and said reservoir, respectively, for equalization of pressure in said suspension unit and said reservoir when said other valve of said pair of valves of said first and second valve means is in an open position in response to said first or second signals.

* * * * *

UNITED STATES PATENT OFFICE
CERTIFICATE OF CORRECTION

Patent No. 3,866,895                    Dated February 18, 1975

Inventor(s) Forrest O. E. Schultz

It is certified that error appears in the above-identified patent and that said Letters Patent are hereby corrected as shown below:

Column 3, line 43, "iss" should be --is--; line 52, "fluctuations" should appear only once.
Column 4, line 41, "requires" should be --required--.
Column 5, line 19, imdependently" should be --independently--; line 56, "independantly" should be --independently--.
Column 6, line 21, "emans" should be --means--; line 49, before "which" insert --in--; line 50, after "one" insert --of-- and "valve" should be --valves--.

Signed and sealed this 29th day of April 1975.

(SEAL)
Attest:

RUTH C. MASON
Attesting Officer

C. MARSHALL DANN
Commissioner of Patents
and Trademarks